US011129330B2

(12) United States Patent
Hong et al.

(10) Patent No.: US 11,129,330 B2
(45) Date of Patent: Sep. 28, 2021

(54) LAWN MOWER ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 16/375,400

(22) Filed: Apr. 4, 2019

(65) Prior Publication Data

US 2019/0307065 A1 Oct. 10, 2019

Related U.S. Application Data

(60) Provisional application No. 62/653,568, filed on Apr. 6, 2018.

(30) Foreign Application Priority Data

Oct. 17, 2018 (KR) .................. 10-2018-0123916

(51) Int. Cl.
*A01D 34/82* (2006.01)
*A01D 34/00* (2006.01)
(Continued)

(52) U.S. Cl.
CPC ........... *A01D 34/82* (2013.01); *A01D 34/008* (2013.01); *A01D 34/64* (2013.01); *A01D 34/74* (2013.01); *A01D 2101/00* (2013.01)

(58) Field of Classification Search
CPC .... A01D 34/008; A01D 34/736; A01D 34/78; A01D 34/81; A01D 34/82; A01D 34/64;
(Continued)

(56) References Cited

U.S. PATENT DOCUMENTS 2,464,912 A 3/1949 White
3,114,229 A 12/1963 Wilson
(Continued)

FOREIGN PATENT DOCUMENTS

AU 2015418271 6/2017
CN 102523841 7/2012
(Continued)

OTHER PUBLICATIONS

Korean Office Action dated May 15, 2020 issued in KR Application No. 10-2018-0123916.
(Continued)

*Primary Examiner* — Abigail A Risic
(74) *Attorney, Agent, or Firm* — KED & Associates LLP

(57) ABSTRACT

The present disclosure relates to a lawn mower robot, and the lawn mower robot may include an outer cover; an inner body accommodated into the outer cover, and provided with a plurality of wheels for traveling on both sides thereof; a blade drive motor mounted inside the inner body; a rotating plate driven by the blade drive motor, and rotatably mounted on a bottom surface of the inner body; a plurality of blades rotatably mounted on the rotating plate, and unfolded to an outside of the rotating plate or folded to an inside of the rotating plate; a blade protection cover disposed on a bottom surface of the inner body to cover the rotating plate and the plurality of blades; and a sealing portion configured to seal between the inner body and the blade protection cover.

15 Claims, 9 Drawing Sheets

(51) Int. Cl.
*A01D 34/64* (2006.01)
*A01D 34/74* (2006.01)
*A01D 101/00* (2006.01)

(58) Field of Classification Search
CPC ...... A01D 34/74; A01D 34/66; A01D 34/007; A01D 2101/00
See application file for complete search history.

(56) References Cited

U.S. PATENT DOCUMENTS

| | | | | |
|---|---|---|---|---|
| 4,194,345 | A * | 3/1980 | Pioch | A01D 34/81 56/17.5 |
| 4,835,952 | A | 6/1989 | McLane | |
| 5,259,175 | A | 11/1993 | Schmidt | |
| 6,470,588 | B1 | 10/2002 | Pilger | |
| 6,999,850 | B2 * | 2/2006 | McDonald | A47L 9/009 700/245 |
| 7,171,799 | B2 | 2/2007 | Takeishi et al. | |
| 8,234,848 | B2 * | 8/2012 | Messina | A01D 34/81 56/17.1 |
| 8,336,282 | B2 | 12/2012 | Messina et al. | |
| 8,387,193 | B2 | 3/2013 | Ziegler et al. | |
| 9,021,777 | B2 * | 5/2015 | Johnson | B60L 1/003 56/320.1 |
| 9,027,189 | B2 | 5/2015 | Hickenbottom et al. | |
| 9,807,930 | B1 | 11/2017 | Lydon et al. | |
| 10,299,432 | B1 | 5/2019 | Kelly et al. | |
| 10,375,880 | B2 * | 8/2019 | Morin | B25J 5/007 |
| 10,555,457 | B2 | 2/2020 | Song et al. | |
| 2005/0021181 | A1 | 1/2005 | Kim et al. | |
| 2005/0044836 | A1 | 3/2005 | Goto et al. | |
| 2012/0023880 | A1 * | 2/2012 | Messina | A01D 34/81 56/10.2 E |
| 2012/0023887 | A1 * | 2/2012 | Messina | B60L 50/66 56/320.1 |
| 2013/0061417 | A1 | 3/2013 | Vanderstegen-Drake et al. | |
| 2013/0291506 | A1 | 11/2013 | Johnson et al. | |
| 2014/0216424 | A1 | 8/2014 | Gartzke et al. | |
| 2015/0271991 | A1 | 10/2015 | Balutis | |
| 2016/0000007 | A1 | 1/2016 | Bian et al. | |
| 2016/0014956 | A1 | 1/2016 | Matsumoto et al. | |
| 2016/0081526 | A1 | 3/2016 | Gottinger et al. | |
| 2016/0128275 | A1 | 5/2016 | Johnson | |
| 2016/0278287 | A1 | 9/2016 | Kasai et al. | |
| 2016/0338262 | A1 | 11/2016 | Liu et al. | |
| 2017/0181375 | A1 * | 6/2017 | Hashimoto | A01D 34/81 |
| 2018/0116109 | A1 | 5/2018 | Matsumoto | |
| 2018/0184583 | A1 * | 7/2018 | Morin | A01D 34/008 |
| 2018/0184585 | A1 | 7/2018 | Song et al. | |
| 2018/0199506 | A1 | 7/2018 | Ito et al. | |
| 2018/0235146 | A1 * | 8/2018 | Hashimoto | A01D 34/78 |
| 2018/0271014 | A1 * | 9/2018 | Matsuzawa | A01D 34/008 |
| 2019/0216012 | A1 | 7/2019 | Hahn et al. | |
| 2019/0223376 | A1 * | 7/2019 | Lee | B25J 13/088 |
| 2019/0258267 | A1 | 8/2019 | Hahn et al. | |
| 2019/0278269 | A1 * | 9/2019 | He | G05D 1/0022 |
| 2020/0170186 | A1 * | 6/2020 | Curtis | F16H 25/20 |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 513 644 | 7/2019 |
| JP | 2012-105557 | 6/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.
European Search Report dated Dec. 17, 2019 issued in EP Application No. 19167046.2.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.
European Search Report dated Aug. 22, 2019 issued in EP Application No. 19152775.3.
European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in EP Application No. 19167046.2.
European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
Korean Notice of Allowance dated Nov. 23, 2020 issued in KR Application No. 10-2018-0123916.
Korean Notice of Allowance dated Dec. 8, 2020 issued in KR Application No. 10-2018-0142916.
Korean Notice of Allowance dated Dec. 8, 2020 issued in KR Application No. 10-2018-0142917.
Korean Notice of Allowance dated Jan. 5, 2021 issued in KR Application No. 10-2018-0121333.

(56) References Cited

OTHER PUBLICATIONS

United States Office Action dated Mar. 16, 2021 issued in U.S. Appl. No. 16/375,217.
United States Notice of Allowance dated Apr. 1, 2021 issued in U.S. Appl. No. 16/375,294.
United States Office Action dated Apr. 9, 2021 issued in U.S. Appl. No. 16/375,505.
United States Office Action dated Apr. 12, 2021 issued in U.S. Appl. No. 16/373,050.
United States Office Action dated Apr. 12, 2021 issued in U.S. Appl. No. 16/375,424.
United States Office Action dated Mar. 4, 2021 issued in U.S. Appl. No. 16/260,865.
United States Office Action dated Mar. 4, 2021 issued in U.S. Appl. No. 16/264,494.

* cited by examiner

LAWN MOWER ROBOT

CROSS-REFERENCE TO RELATED APPLICATIONS

Pursuant to 35 U.S.C. § 119(a), this application claims the benefit of the earlier filing date and the right of priority to U.S. Provisional Application No. 62/653,568, filed on Apr. 6, 2018, and Korean Application No. 10-2018-0123916, filed on Oct. 17, 2018, whose entire disclosures are hereby incorporated by reference. This application is also related to U.S. application Ser. No. 16/373,050, filed Apr. 2, 2019, U.S. application Ser. No. 16/375,424 filed Apr. 4, 2019, U.S. application Ser. No. 16/375,505 filed Apr. 4, 2019, U.S. application Ser. No. 16/375,217, filed Apr. 4, 2019, and U.S. application Ser. No. 16/375,294, filed Apr. 4, 2019, whose entire disclosures are also hereby incorporated by reference. This application is also related to U.S. patent application Ser. No. 16/260,865 filed on Jan. 29, 2019 and U.S. patent application Ser. No. 16/264,494 filed on Jan. 31, 2019.

BACKGROUND

1. Field

The present disclosure relates to a lawn mower robot for mowing the grass with a blade rotated by a motor.

2. Background

Lawn mower is a device for cutting and trimming the grass planted in a yard at home, a playground, a golf course, or the like. In recent years, an automated robot-type lawn mower has been developed to reduce a user's labor of having to manually operate a lawn mower to mow the grass and reduce an additional cost incurred by hiring outsiders to mow the grass. A lawn mower robot may travel by rotating a plurality of wheels with an electric motor mounted on both front and rear sides of a robot body, and a traveling direction of the robot may be manipulated by controlling the number of revolutions of electric motor.

A co-assigned patent application for a lawn mower robot (Korean Patent Application No. 10-2017-0000416, filed on Jan. 2, 2017, now issued as Korean Patent No. 10-1915547) has been granted. The lawn mower robot of the granted patent may be mounted with a motor inside an inner body to rotate a blade using the power of the motor so as to cut the grass. Furthermore, in the lawn mower robot of the granted patent, a lifting frame may be installed in a vertically movable manner inside the inner body, and a rotating plate for rotating the blade may be mounted on a bottom surface of the lifting frame, thereby adjusting the height of the blade.

On the other hand, there are many places where part of the ground is recessed, such as puddles, and water such as rain is often gathered in puddles. However, in the lawn mower robot in the related art, since a lower portion of the robot is immersed in water when traveling a puddle in which the water is gathered or the like, the water may infiltrate into an inside of the robot, thereby causing an electrical short circuit in a blade motor or the like. In addition, in the lawn mower robot in the related art, the blade and the rotating plate may be configured to move or rotate in a vertical direction, thereby causing difficulty in applying a waterproof structure thereto.

The above references are incorporated by reference herein where appropriate for appropriate teachings of additional or alternative details, features and/or technical background.

BRIEF DESCRIPTION OF THE DRAWING

The embodiments will be described in detail with reference to the following drawings in which like reference numerals refer to like elements wherein.

DETAILED DESCRIPTION

Figure 1:
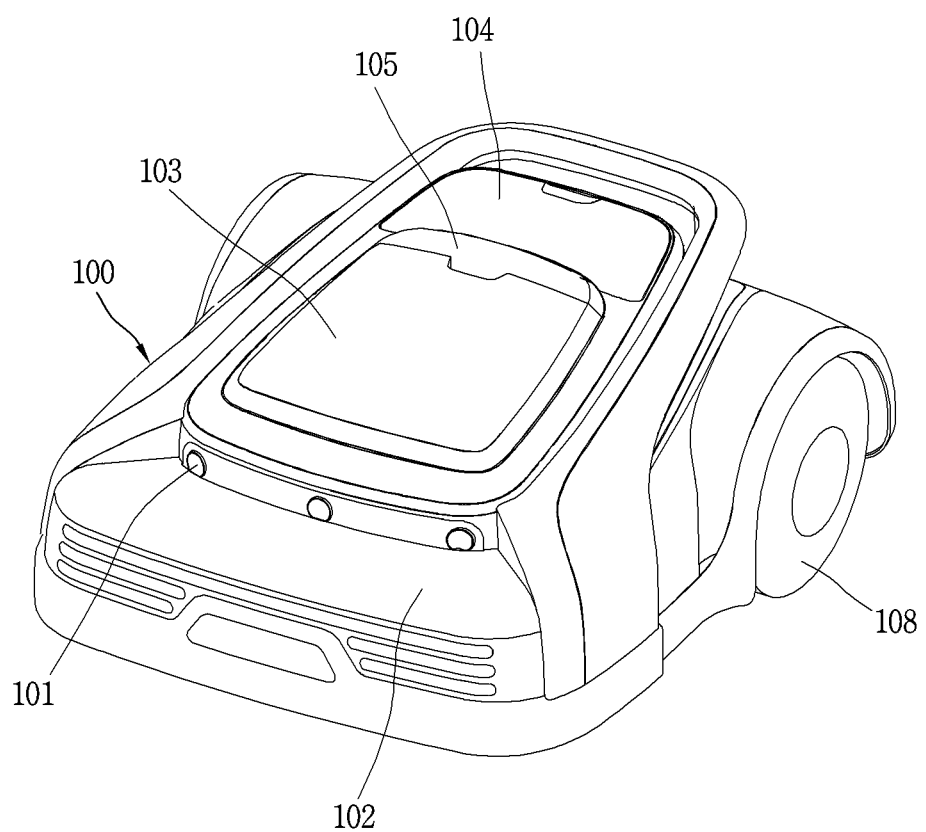
FIG. 1 is a perspective view showing an appearance of a lawn mower robot according to the present disclosure.
Figure 2:
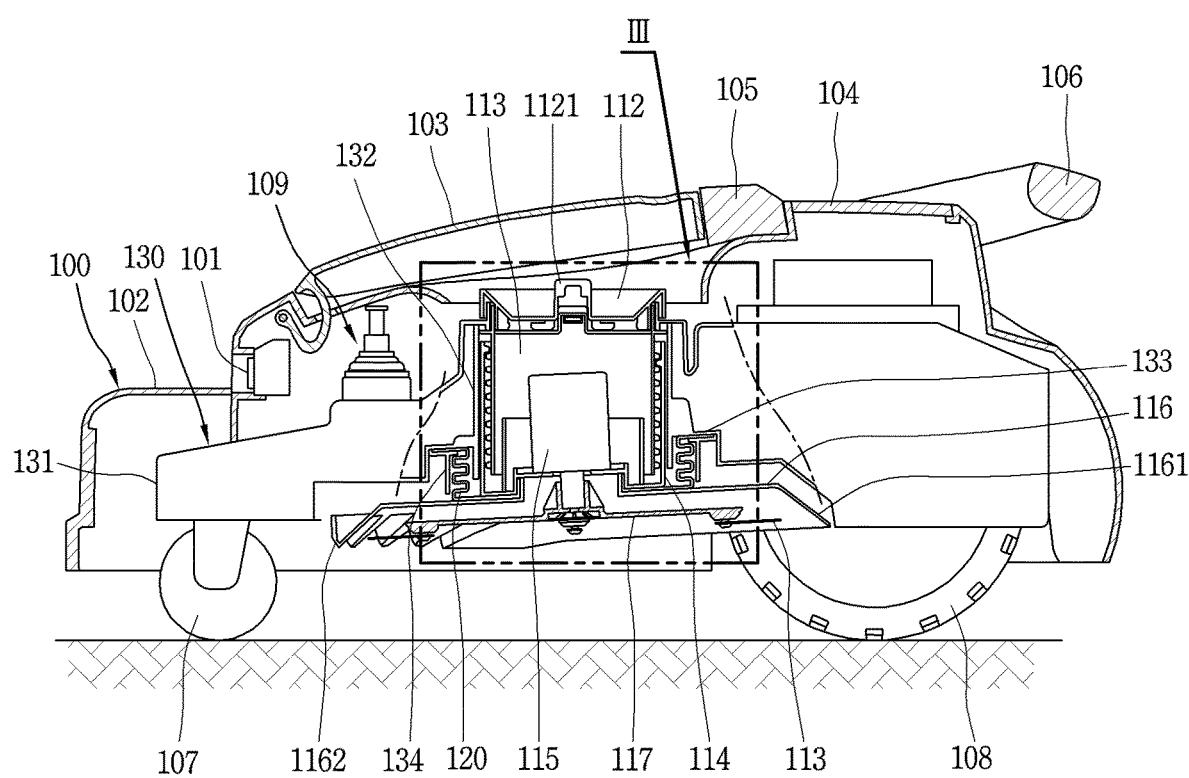
FIG. 2 is a cross-sectional view taken along line II-II in FIG. 1.
Figure 3:
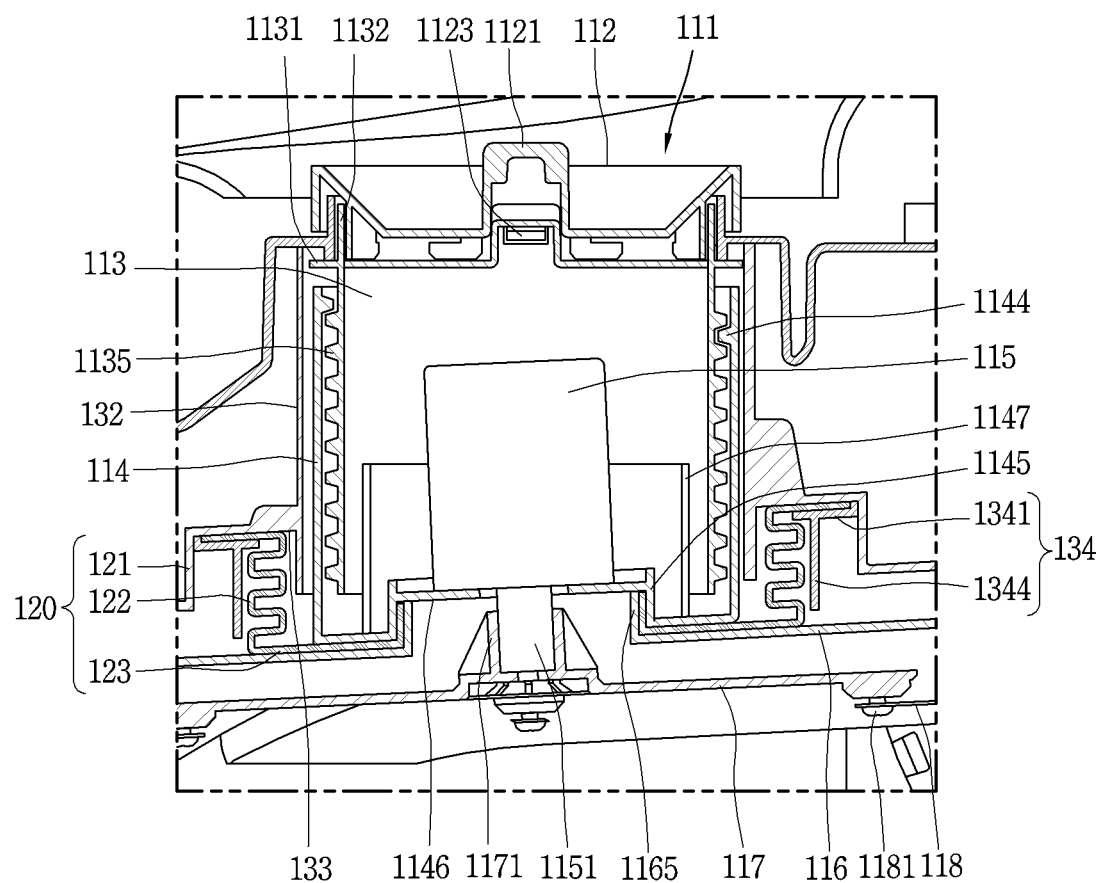
FIG. 3 is an enlarged view in which portion III in FIG. 2 is enlarged.
Figure 4:
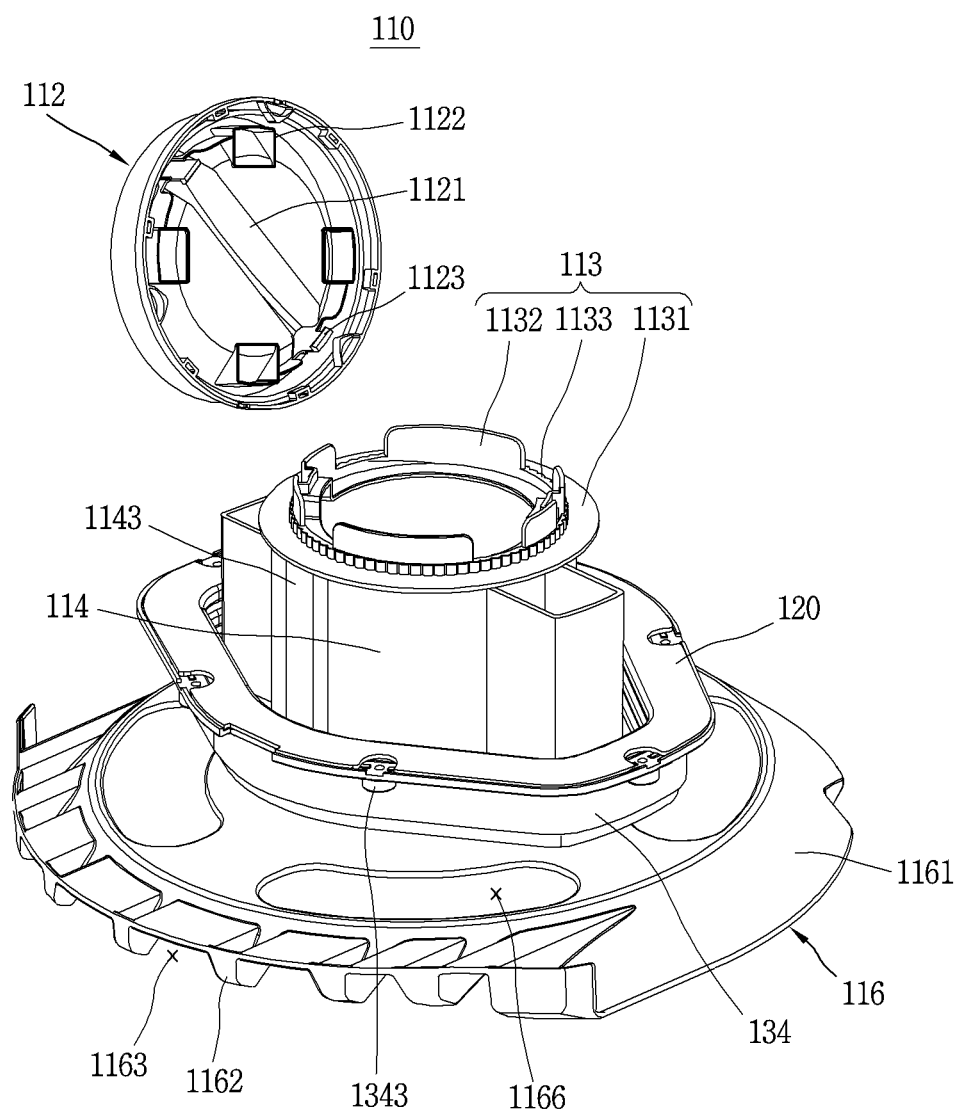
FIG. 4 is a conceptual view illustrating a blade assembly 110 in FIG. 3.
Figure 5:
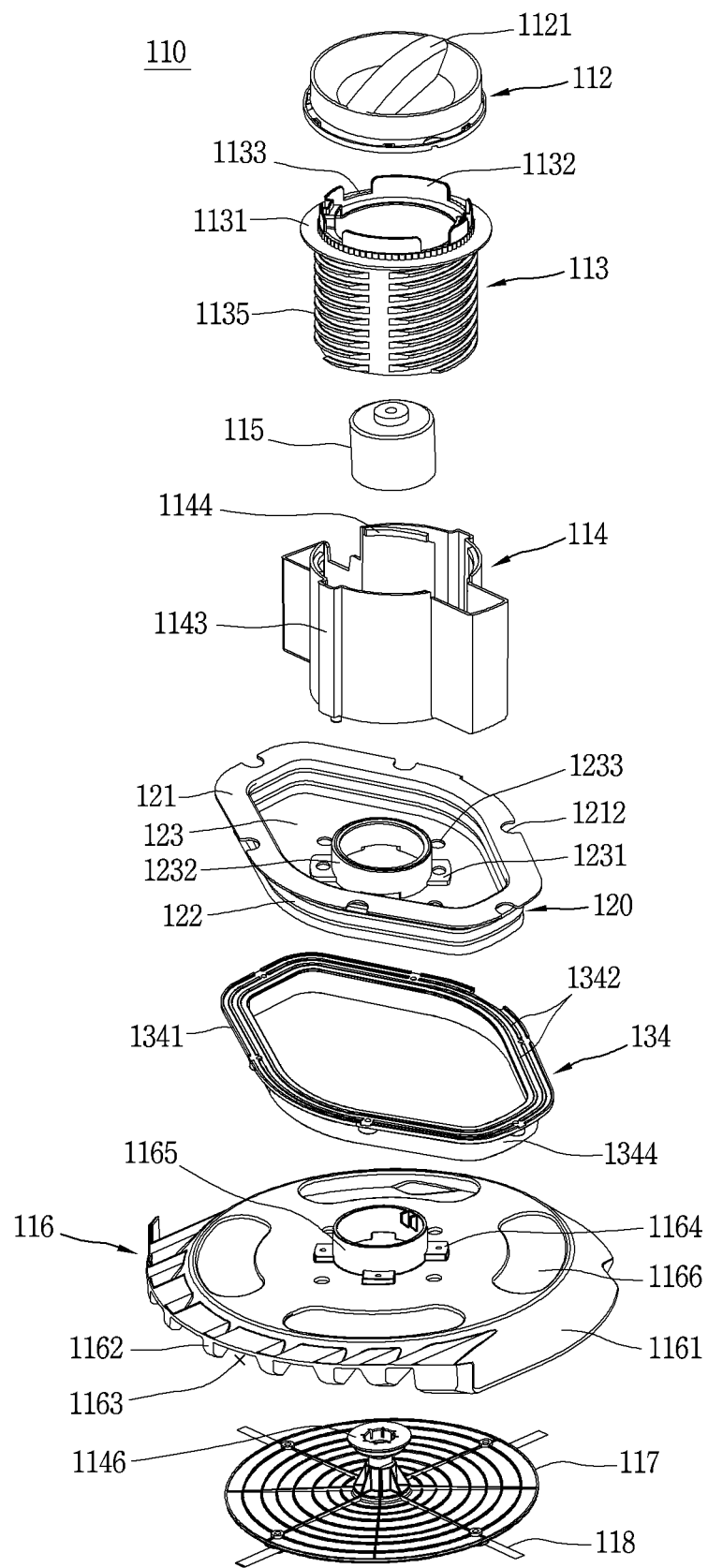
FIG. 5 is an exploded view of the blade assembly 110 in FIG. 4.
Figure 6:
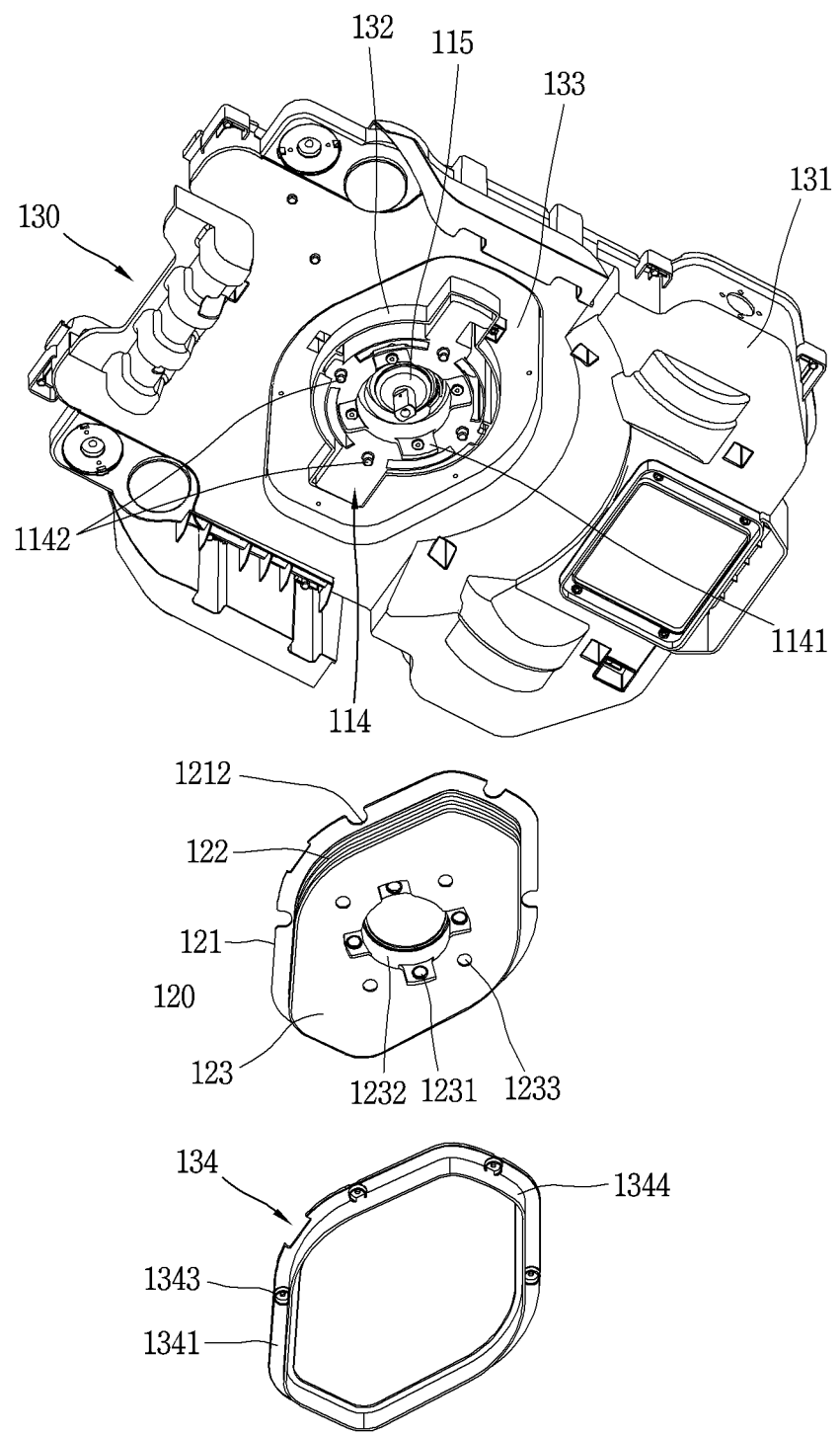
FIG. 6 is an exploded view showing a state in which a bellows shaped waterproof unit to be mounted on a bottom surface of the inner body 130 is disassembled.
Figure 7:
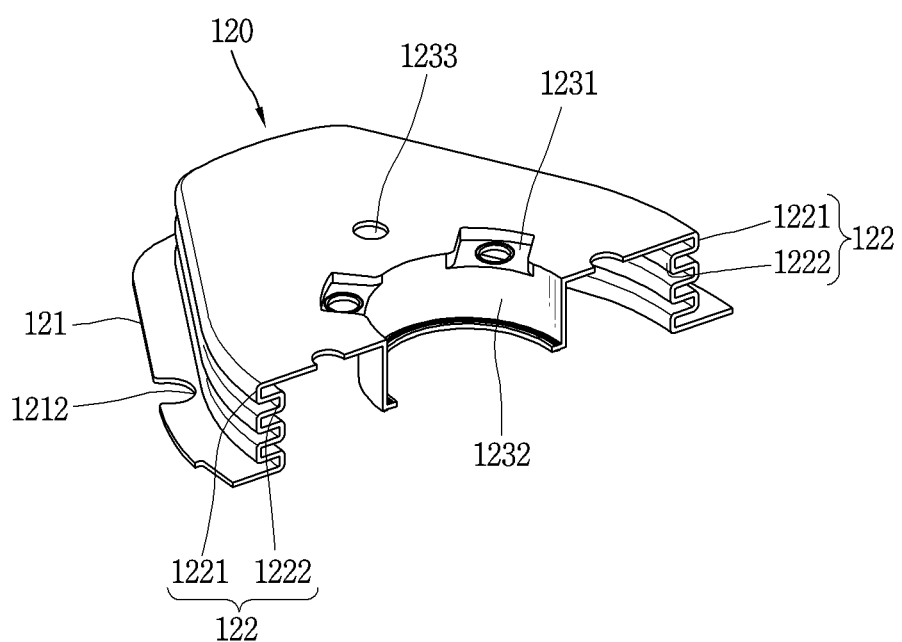
FIG. 7 is a conceptual view showing a cross-sectional structure of the waterproof unit in FIG. 6.
Figure 8:
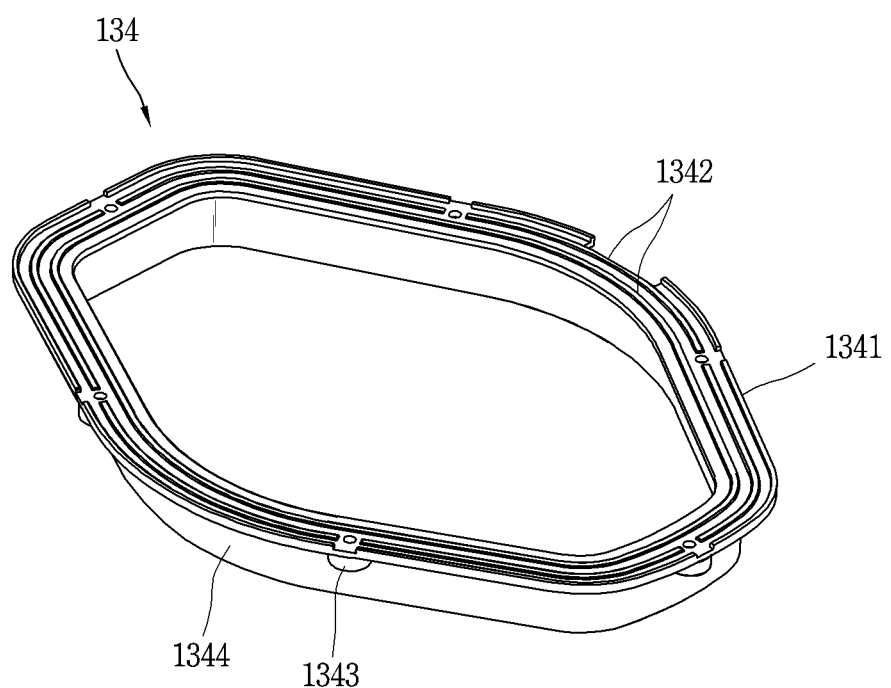
FIG. 8 is a conceptual view showing a state in which a mounting guide 134 in FIG. 6 is viewed from above.
Figure 9:
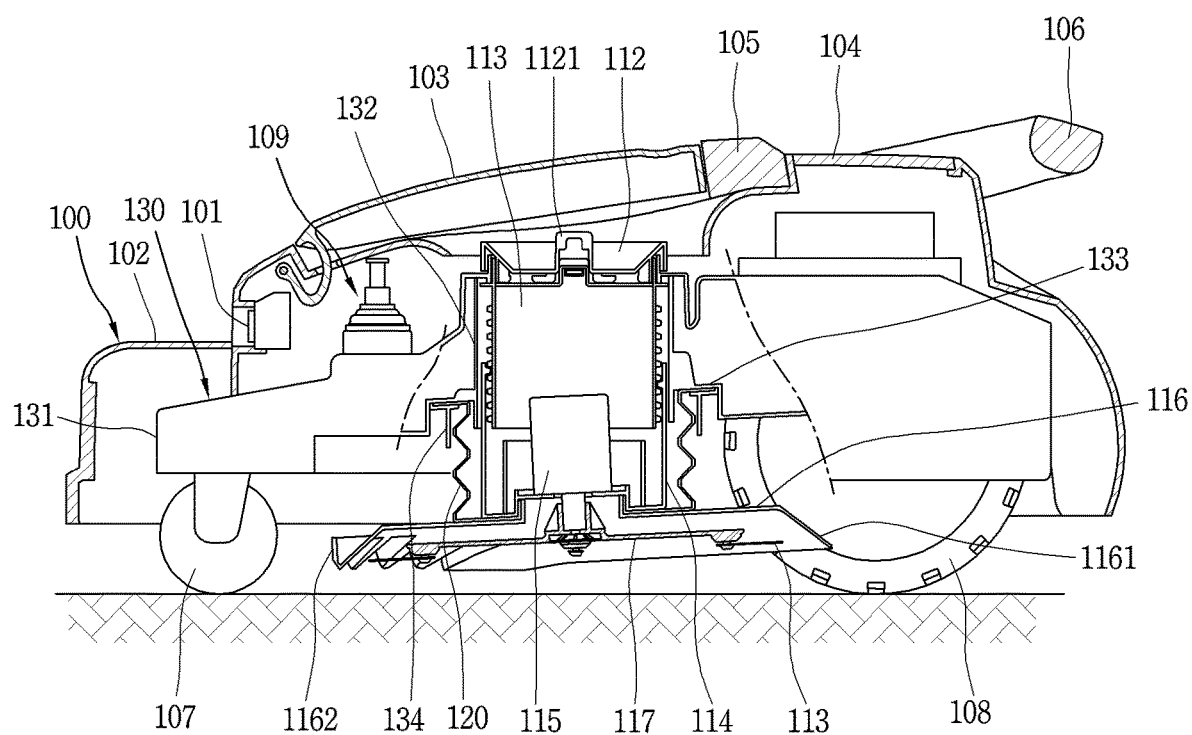
FIG. 9 is an operational state view showing the operation state of the waterproof unit when adjusting a height of the blade 118 in FIG. 2.

FIG. 1 is a perspective view showing an appearance of a lawn mower robot according to the present disclosure, and FIG. 2 is a cross-sectional view taken along line II-II in FIG. 1, and FIG. 3 is an enlarged view in which portion III in FIG. 2 is enlarged, and FIG. 4 is a conceptual view illustrating a blade assembly 110 in FIG. 3, and FIG. 5 is an exploded view of the blade assembly 110 in FIG. 4, and FIG. 6 is an exploded view showing a state in which a bellows shaped waterproof unit to be mounted on a bottom surface of the inner body 130 is disassembled, and FIG. 7 is a conceptual view showing a cross-sectional structure of the waterproof unit in FIG. 6, and FIG. 8 is a conceptual view showing a state in which a mounting guide 134 in FIG. 6 is viewed from above, and FIG. 9 is an operational state view showing the operation state of the waterproof unit when adjusting a height of the blade 118 in FIG. 2.

The lawn mower robot of the present disclosure includes an outer cover (or upper cover) 100, an inner body (or inner frame) 130, and a blade assembly 110. The outer cover 100 is configured to enclose an outer side of the inner body 130, and forms an outer appearance of the robot. A bumper portion such as a rubber material may be mounted on a front lower side of the outer cover 100 to alleviate impact while colliding with an obstacle.

A plurality of ultrasonic sensor modules 101 may be provided on a front upper side of the outer cover 100. Each of the plurality of ultrasonic sensor modules 101 may include a transmitter for transmitting ultrasonic waves in a forward direction and a receiver for receiving ultrasonic waves reflected from an obstacle so as to sense the obstacle.

The plurality of ultrasonic sensor modules 101 may be spaced apart in a width direction of the outer cover 100. The ultrasonic sensor module 101 may be configured to transmit ultrasonic waves at a predetermined height or more.

An ultrasonic guide unit 102 is formed in a planar shape at a predetermined height from the ground in front of the outer cover 100 to prevent ultrasonic waves from being transmitted to a lower portion of the ultrasonic guide unit 102, thereby transmitting ultrasonic waves at a height above the ultrasonic guide unit 102. According to such a configuration, it may be possible to prevent the grass from being mistaken as an obstacle because ultrasonic waves are transmitted to a lower portion of the ultrasonic guide unit 102. Ultrasonic side guides may be formed on both sides of the ultrasonic sensor module 101 to transmit ultrasonic waves at a predetermined angle in a width direction of the outer cover 100.

A control unit may receive a sensing signal from the ultrasonic sensor module 101 to control the robot. The control unit may receive a signal from the ultrasonic sensor module 101 to stop the operation of the robot.

A first upper cover 103 and a second upper cover 104 may be hinge-coupled to an upper portion of the outer cover 100 to be open and closed in a vertical direction so as to perform maintenance and management of the robot. For example, when the first upper cover 103 rotates upward to open, a knob 112 for adjusting a height of the blade 118 mounted on an upper portion of the inner body 130 through the first upper cover 103 may be exposed to adjust the height of the blade 118 by rotating the knob 112.

When the second upper cover 104 rotates upward to open, a display unit, a control unit, and the like mounted on an upper rear side of the inner body 130 may be exposed through the second upper cover 104. A stop switch 105 may be disposed between the first upper cover 103 and the second upper cover 104 to allow a user to stop the operation of the robot by pressing the stop switch 105 in an emergency. A handle 106 may be mounted on an upper portion of the outer cover 100 to allow the user to grip a handle 106 with his or her hand and then carry the robot.

The inner body 130 may be accommodated into the outer cover 100. The inner body 130 may have a housing space therein. The inner body 130 may include an inner body unit 131 and an inner body cover 130.

A plurality of casters 107 may be mounted on both sides of the inner body 130 to rotate 360 degrees. A plurality of wheel drive motors may be mounted on both rear sides of the inner body 130 by a drive motor holder, and the plurality of wheels 108 may be connected to and rotatably mounted on the wheel drive motors via a rotary shaft. According to such a configuration, as the wheel drive motor (not shown) is operated, the wheel 108 rotates to allow the robot to travel.

The plurality of wheel drive motors may be configured to independently drive the plurality of wheels 108. According to such a configuration, the wheel drive motor may receive a control signal from the control unit to adjust the rpm (number of revolutions per minute) of the wheel so as adjust a traveling direction of the robot.

Support portions may be mounted on both left and right sides of a front portion of the inner body 130 and right and left sides of a rear portion thereof. The plurality of support portions may be made of a rubber material. The plurality of support portions may be extended vertically in a top-down direction, and an intermediate portion thereof may be formed to have a smaller cross-sectional area than that of both upper and lower end portions thereof in a length direction of the support portion.

An upper end portion of the plurality of supports may be connected to the outer cover 100, and a lower end portion thereof may be connected to the inner body 130 to elastically support the outer cover 100 so as to be movable in front-rear and left-right directions. According to such a configuration, the support portion may alleviate impact when colliding with the outer cover 100.

A joystick bumper 109 may be rotatably mounted in a front-rear direction at a front central portion of the inner body 130. The joystick bumper 109 may be configured with a bar extended in a vertical direction. An upper end portion of the joystick bumper 109 may be connected to the outer cover 100, and an intermediate portion of the joystick bumper 109 may be hinge-coupled to the inner body 130 to rotate a lower end portion of the joystick bumper 109 in a front-rear direction.

The joystick bumper 109 may further include a return spring (not shown). The return spring may be formed in a coil shape, and mounted to enclose a lower portion of the joystick bumper 109.

One end portion of the return spring may be fixed to the inner body 130, and the other end portion of the return spring may be fixed to a lower portion of the joystick bumper 109 by a spring seat portion to rotate together with a lower end portion of the joystick bumper 109. According to such a configuration, when the outer cover 100 is pushed backward when colliding with the outer cover 100, the return spring may move the outer cover 100 to its original position by elastically supporting the lower portion of the joystick bumper 109.

The inner body 130 may be provided with a collision sensor unit (not shown). The collision sensor unit may be configured with a permanent magnet and a hall sensor. The permanent magnet may be provided at a lower end of the joystick bumper 109, and the hall sensor may be provided at the inner body 130 to face the permanent magnet. According to such a configuration, when the outer cover 100 collides with an obstacle, an upper end portion of the joystick bumper 109 connected to the outer cover 100 is pushed backward, and a lower end portion of the joystick bumper 109 rotates forward about the hinge-coupled intermediate portion.

The permanent magnet mounted on a lower end of the joystick bumper 109 may be spaced forward from the hall sensor, and thus the hall sensor may sense that the outer cover 100 has collided with an obstacle. The control unit may receive a sensing signal from the hall sensor, reverse the robot from the obstacle, and control the wheel driving motor such that the robot bypasses the obstacle.

The blade assembly 110 may be mounted at the center of the inner body 130 in a length direction. To this end, a blade mounting portion 132 may be extended vertically in a cylindrical shape and formed in a penetrating manner inside the inner body unit 131, and thus the blade assembly 110 may be accommodated and mounted inside a blade mounting portion 132.

The blade assembly 110 includes a blade height adjusting unit 111, a blade drive motor 115, a waterproof unit, a blade protection cover (or lower cover) 116, a rotating plate 117, and a plurality of blades 118. The blade height adjusting unit 111 may include a knob 112, a rotating cylindrical portion (or cylinder) 113, and a lifting frame 114 to adjust the height of the blade 118.

The knob 112 may be formed in a cylindrical shape, and an upper surface of the knob 112 may be formed concavely to be recessed in an inner downward direction from an upper end of an edge thereof. A handle portion 1121 of the knob 112 may be protruded upward from an inner upper surface of the knob 112 and extended in a radial direction. Due to this, the user may hold the handle portion 1121 of the knob 112 to rotate.

The rotating cylindrical portion 113 may be rotatably mounted on the blade mounting portion 132 of the inner body 130 in place. To this end, a support protrusion 1131 may be extended from an upper end portion of an outer circumferential surface of the rotating cylindrical portion 113 in a radially outward direction. An inner protrusion may be protruded in a radial direction from an inside of the blade mounting portion 132 such that the support protrusion 1131 is caught therein The support protrusion 1131 of the rotating cylindrical portion 113 may be disposed to vertically overlap with an upper portion of the inner protrusion of the blade mounting portion 132, and thus the rotating cylindrical portion 113 may be rotatably supported by an inside of the inner body 130.

The knob 112 may be coupled to an upper portion of the rotating cylindrical portion 113 to allow the rotating cylindrical portion 113 together with the knob 112 to be rotatably coupled thereto. To this end, a plurality of protruding portions 1122 may be provided on a bottom surface of the knob 112. The plurality of protruding portions 1122 may be spaced apart in a circumferential direction. The plurality of protruding portions 1122 may be formed in a rectangular box shape when viewed from the bottom to the top, and may have a right triangle structure when viewed from the side.

An extension portion 1132 may be formed to protrude upward from an upper end portion of the rotating cylindrical portion 113, and a plurality of receiving portions 1133 may be formed on the extension portion 1132. The plurality of receiving portions 1133 are configured to receive the plurality of protruding portions 1122 so as to be coupled to the protruding portions 1122. According to such a configuration, the rotating cylindrical portion 113 may be rotated together with the knob 112 when the handle portion 1121 of the knob 112 is rotated.

The knob 112 may have a plurality of engaging hooks 1123 on both sides of the handle portion 1121 in the radial direction on a bottom surface thereof. A plurality of engaging portions 1134 may be formed at positions corresponding to the plurality of engaging hooks 1123 on the extension portion 1132 of the rotating cylindrical portion 113, and thus the engaging hooks 1123 may be configured to engage with the engaging portions 1134. According to such a configuration, as the engaging hook 1123 engages with the engagement portion 1134, the knob 112 may be prevented from being released upward from the rotating cylindrical portion 113.

A hollow portion may be formed through the rotating cylindrical portion 113 to receive the blade drive motor 115. The rotating cylindrical portion 113 may be extended in a vertical direction to be disposed vertically. The lifting frame 114 is formed in a cylindrical shape, and configured with a structure that is open in an upward direction and closed in a downward direction. The lifting frame 114 may enclose the rotating cylindrical portion 113 to accommodate the rotating cylindrical portion 113 therein.

The lifting frame 114 is disposed outside the rotating cylindrical portion 113, and configured to be movable in a vertical direction in association with the rotation of the rotating cylindrical portion 113 without rotating in a circumferential direction. To this end, a rotation restricting protrusion 1143 may be extended in a vertical direction on an outer circumferential surface of the lifting frame 114 and protruded in a radially outward direction, and thus the rotation restricting protrusion 1143 may engage with the protruding portion 1122 protruded from the blade mounting portion 132 to restrict the lifting frame 114 from rotating in a circumferential direction.

A male screw portion 1135 may be formed on an outer circumferential surface of the rotating cylindrical portion 113. A plurality of spiral protrusions 1144 may be spirally protruded at a upper end portion of an inner circumferential surface of the lifting frame 114, and thus the male screw portion 1135 and the spiral protrusion 1144 may be tooth-coupled with each other. According to such a configuration, as the rotating cylindrical portion 113 rotates in a circumferential direction, the lifting frame 114 may move in a vertical direction.

The blade drive motor 115 may be mounted into the lifting frame 114. A motor mounting portion (or motor mounting surface) 1145 may be extended to protrude upward from an inner bottom surface of the lifting frame 114, and the motor landing portion (or motor landing surface) 1146 may be extended in a radial direction from an inner circumferential surface of the motor mounting portion 1145, and thus the blade drive motor 115 may be seated and supported by the motor landing portion 1146. The blade drive motor 115 may be fastened to an upper portion of the motor landing portion 1146.

An inner partition wall 1147 may be formed to protrude inside the lifting frame 114. The inner partition wall 1147 may be extended in a circumferential direction, and extended upward higher than the motor mounting portion 1145, and configured to enclose an outside of the blade drive motor 115. The inner partition wall 1147 may be protruded between the rotating cylindrical portion 113 and the motor mounting portion 1145 and disposed to be radially spaced apart from the rotating cylindrical portion 113.

The blade drive motor 115 may be provided with a motor shaft 1151 protruded downward from a bottom surface thereof, and the motor shaft 1151 may be fastened to the center of the rotating plate 117 to rotate the rotating plate 117 as the blade drive motor 115 is operated. A shaft coupling portion 1171 may be protruded upward in a central portion of the rotating plate 117, and thus the shaft coupling portion 1171 and the motor shaft 1151 may be fastened to each other. The motor shaft 1151 may be disposed in an inclined manner at a preset angle (e.g., 3 degrees) in a forward direction from the vertical line.

The plurality of blades 118 may be rotatably mounted on the rotating plate 117. The plurality of blades 118 may be respectively spaced apart in a circumferential direction on an edge portion of the rotating plate 117. One end portion of each of the blades 118 may be fastened to the rotating plate 117 by a fastening bolt 1181.

The other end portion of the blade 118 is rotated (unfolded) to an outside of the rotating plate 117 around the fastening bolt 1181 by a centrifugal force when the rotating plate 117 rotates or rotated (folded) to an inside of the rotating plate 117.

When the blade drive motor 115 rotates, the rotating plate 117 receives power through the motor shaft 1151 to rotate, and the blade 118 rotates to an outside of the rotating plate 117 by a centrifugal force to mow the grass. The rotating plate 117 may be disposed in an inclined manner with respect to a horizontal plane so that a front end portion thereof is located lower than a rear end portion thereof.

The blade 118 disposed in front of the rotating plate 117 may be located lower than the blade 118 disposed behind the rotating plate 117 to mow the grass shorter. Furthermore, the other end portion of the blade 118 in a length direction may be located lower than the one end portion (a portion to be engaged with the fastening bolt 1181) thereof when the rotation plate 117 rotates.

The blade 118 may be located lower than the rotating plate 117. The blade 118 may be located lower than a plane perpendicular to the motor shaft 1151. According to such a configuration, the blade 118 may reduce a cutting load on the blade 118 when mowing the grass while moving in a traveling direction of the robot.

The blade protection cover 116 may be configured to prevent stone fragments from bouncing out of the outer cover 100 while the blade 118 collides with a stone or the like. The blade protection cover 116 may be fastened to a bottom surface of the lifting frame 114 to move in a vertical direction together with the rotating plate 117 and the blade 118.

To this end, the blade protection cover 116 has a tapered portion 1161 formed to be inclined downward along the edge portion. The tapered portion 1161 may be disposed lower than a plane perpendicular to a central shaft of the blade 118. A plurality of protrusion portions 1162 may be formed on a front portion of the blade protection cover 116. The plurality of protruding portions 1162 may be spaced apart from each other along a circumferential direction at the front center of the blade protection cover 116.

A plurality of grass inlets 1163 may be formed on a front portion of the blade protection cover 116. The plurality of grass inlets 1163 and the plurality of protruding portions 1162 may be alternately arranged to be spaced apart in a circumferential direction.

The plurality of protruding portions 1162 may be spaced to have a smaller interval from the front center toward the left and right sides along a circumferential direction of the blade protection cover 116. The plurality of protruding portions 1162 may be arranged so as to be overlapped on both right and left sides in a tangential direction from the center of a front end portion of the rotating plate 117.

According to such a configuration, not only the grass may easily enter an inside of the blade protection cover 116 toward the blade 118 through the grass inlets 1163 but also the plurality of protruding portions 1162 may be arranged to be overlapped in a tangential direction from a front side of the rotating plate 117, thereby preventing stone fragments from bouncing out to both the left and right sides when the blade 118 collides with a stone or the like.

A plurality of through holes 1166 may be formed on an upper surface of the blade protection cover 116. The plurality of through holes 1166 may be arranged to be spaced apart in a circumferential direction. Each of the plurality of through holes 1166 may be formed in an arc shape.

According to such a configuration, the plurality of through holes 1166 may induce fragments generated while the blade 118 collides with foreign matter such as a stone to be bounced out through an upper surface of the blade protection cover 116, thereby allowing the fragments to be reflected by a bottom surface of the inner body 130 to fall to the ground.

As a result, pieces such as a stone or the like may be reflected by various paths inside the blade protection cover 116 not to directly apply impact on the blade protection cover 116, and passed through an upper portion of the blade protection cover 116 via the through holes 1166 and induced to be scattered to a recessed structure of the inner body 130 to extend a scattering distance of the pieces and reflect the pieces at least once on the structure of the inner body 130, thereby alleviating impact due to the fragments as well as preventing the risk of secondary safety accidents due to the fragments on the blade 118 since the fragments fall to the ground by colliding with a bottom surface of the inner body 130.

The waterproof unit is configured to prevent water from infiltrating into the robot from a lower portion of the robot when the robot travels a puddle or the like. The waterproof unit may include a sealing portion 120 and a mounting guide 134.

The sealing portion (or seal) 120 may be made of a material such as rubber having elasticity and capable of performing a waterproof function. One side of the sealing portion 120 may be fastened to a bottom surface of the inner body 130, and the other side of the sealing portion 120 may be fastened to an upper portion of the blade protection cover 116.

The sealing portion 120 may be configured to accommodate a lower portion of the lifting frame 114 and enclose a bottom surface of the lifting frame 114. The sealing portion 120 may be formed in a hexagonal shape having rounded corners.

The sealing portion 120 may include an upper fastening portion (or upper fastening extension) 121, a corrugated portion (or corrugated tube) 122, and a lower fastening portion (or lower fastening extension) 1231. The corrugated portion 122 may be formed in a bellows shape on a lateral side of the sealing portion 120. The corrugated portion 122 may include a plurality of U-shaped bent portions 1221 and a plurality of connecting portions 1222 that connect the plurality of bent portions 1221. The plurality of bent portions 1221 and connecting portions 1222 may be alternately arranged to be spaced apart in a vertical direction.

The upper fastening portion 121 may be radially extended in a planar shape from an upper end of the corrugated portion 122, and fastened to the inner body 130. A cutout groove portion (or cutout groove) 1212 may be formed in a semicircular cutout shape on the upper fastening portion 121, and thus a fastening member such as a bolt may fasten the upper fastening portion 121 of the sealing portion 120 and a mounting guide which will be described later to the inner body 130 through the cutout groove portion 1212.

If the cutout groove portion 1212 is not formed in the upper fastening portion 121, when the fastening member is brought into contact with the upper fastening portion 121 made of rubber, the sealing portion 120 may be torn. Therefore, it is preferable to form the cutout groove portion 1212 in order to prevent the sealing portion 120 from being torn.

A depressed portion (or depression) 133 may be formed on an outer side of a lower end portion of the blade mounting portion 132 to protrude upward inwardly to fasten the sealing portion 120 to the inner body 130. The depressed portion 133 may be seen as a structure recessed toward an inner side of the inner body 130 when viewed from a bottom surface of the inner body 130.

A plurality of engaging grooves may be formed on the depressed portion 133 to fasten engaging members such as screws to the plurality of engaging grooves. The mounting guide 134 may be configured to allow the upper fastening portion 121 of the sealing portion 120 to be brought into close contact with the depressed portion 133 and mounted on the inner body 130.

The mounting guide 134 may include a close contact portion (or contact surface) 1341 formed in a planar shape on the upper side so as to be in contact with a lower surface of the upper fastening portion 121 and a shielding wall (or wall) 1344 extended in a vertically downward direction from the close contact portion 1341.

The shielding wall 1344 may be formed to extend in a vertical direction from a bottom surface of the close contact portion 1341 so as to enclose the corrugated portion 122 of the sealing portion 120. The close contact portion 1341 may have a hexagonal shape having rounded corners. A width of the close contact portion 1341 may be divided into an outer portion disposed on an outer side of the shielding wall 1344 with respect to the shielding wall 1344 and an inner portion. The outer portion of the close contact portion 1341 may be extended to be longer than the inner portion.

A plurality of close contact protrusions (or protrusions) 1342 may be protruded from an upper surface of the close contact portion 1341 in a concavo-convex shape. The plurality of close contact protrusions 1342 may be extended along an edge of the close contact portion 1341, and spaced apart in a width direction of the close contact portion 1341.

According to such a configuration, when a fastening force by the fastening member is transmitted from the close contact portion 1341 of the mounting guide 134 to the upper fastening portion 121 of the sealing portion 120, a close contact area due to the unevenness of the close contact protrusion 1342 between the upper fastening portion 121 of the sealing portion 120 and the close contact protrusion 1342 of the mounting guide 134 may be increased, thereby improving watertightness performance.

A plurality of boss portions 1343 may be formed to protrude from an outer portion of the close contact portion 1341. The plurality of boss portions 1343 may be spaced apart along the close contact portion 1341.

Each of the plurality of boss portions 1343 may be vertically extended in a cylindrical shape so that fastening member such as screws are inserted and fastened to the boss portions 1343, thereby allowing the mounting guide 134 to fasten the upper fastening portion 121 of the sealing portion 120 to the depressed portion 133 on a bottom surface of the inner body unit 131 in a close contact manner.

When the blade collides with a stone or the like, the shielding wall 1344 may prevent stone fragments from flying to the corrugated portion 122 of the sealing portion 120 while the fragments are being bounced out to the depressed portion 133 of the inner body unit 131 via the through holes 1166 of the blade protection cover 116. According to this, the shielding wall 1344 may protect the sealing portion 120 from impact by the fragments.

A plurality of lower fastening portions (or lower fastening extensions or regions) 1231 are configured to fasten the lower surface portion 123 of the sealing portion 120 and an upper surface of the blade protection cover 116. The plurality of lower fastening portions 1231 may be protruded upward in a rectangular shape from the lower surface portion 123 of the sealing portion 120. The plurality of lower fastening portions 1231 may be spaced apart in a circumferential direction. The plurality of lower fastening portions 1231 may be seen as a structure recessed upward inwardly when viewed from a bottom surface of the sealing portion 120.

A plurality of fastening portions (or fastening regions) 1141 may be recessed in a rectangular shape on a lower surface of the lifting frame 114. The plurality of lower fastening portions 1141 may be spaced apart in a circumferential direction. Furthermore, the plurality of fastening protrusions 1142 may be formed in a cylindrical shape on a lower surface of the lifting frame 114. The plurality of fastening portions 1141 and fastening protrusions 1142 may be alternately disposed apart from each other.

A plurality of upper fastening portions (or upper fastening extensions) 1164 may be protruded in a rectangular shape on an upper surface of the blade protection cover 116. The plurality of upper fastening portions 1164 may be spaced apart in a circumferential direction.

In order from the bottom to the top, an upper surface of the blade protection cover 116, the lower surface portion 123 of the sealing portion 120 and a lower surface of the lifting frame 114 may be vertically arranged in a stacked manner, and the upper fastening portion 1164 of the lifting frame 114 may be inserted into a bottom surface of the lower fastening portion 1231 of the sealing portion 120, and the lower fastening portion 1231 of the sealing portion 120 may be inserted into and coupled to a bottom surface of the fastening portion 1141 of the lifting frame 114.

A plurality of fastening holes 1233 may be formed in the upper fastening portion 1164 of the blade protection cover 116 and the lower fastening portion 1231 of the sealing portion 120, respectively, and a plurality of fastening grooves may be formed on the fastening portions 1141 of the lifting frame 114, and thus a plurality of fastening members such as screws may be fastened to the fastening grooves of the lift frame 114 through the blade protection cover 116 and the sealing portion 120.

A circular protruding portion (or circular protruding surface) 1165 may be extended upward from an upper central portion of the blade protection cover 116, and a circular receiving portion (or circular receiving surface) 1232 may be extended upward from a bottom surface of the sealing portion 120 to enclose an outer circumferential surface of the circular protruding portion 1165. The circular protruding portion 1165 of the blade protection cover 116 may be inserted into and coupled to the circular receiving portion 1232 of the sealing portion 120, and the circular receiving portion 1232 of the sealing portion 120 may be inserted into and coupled to an inside of the motor mounting portion 1145 of the lifting frame 114.

According to such a configuration, the sealing portion 120 and the blade protection cover 116 may be mounted on a bottom surface of the lifting frame 114 so as to be able to move up and down. Furthermore, the sealing portion 120 may be easily assembled to a bottom surface of the lifting frame 114.

Accordingly, the upper fastening portion 121 of the sealing portion 120 may be fastened to a lower portion of the inner body 130, the lower fastening portion 1231 of the sealing portion 120 may be fastened in a stacked manner between a lower surface of the lifting frame 114 and an upper surface of the blade protection cover 116 to seal between the inner body 130 and the blade protection cover 116, thereby preventing water from infiltrating into a lawn mower robot, that is, between the inner body 130 and the blade protection cover 116, when the robot is immersed in water gathered in a paddle while traveling the puddle or the like.

Furthermore, the sealing portion 120 may have the corrugated portion 122 that can be folded or unfolded in a vertical direction on a lateral side thereof to adjust a length of the sealing portion 120 according to a height of the blade protection cover 116, thereby blocking the infiltration of water even when the height of the blade 118 and the blade protection cover 116 is adjusted. Besides, the mounting guide 134 may have a planar close contact portion 1341 on an upper surface thereof to fasten the upper fastening portion 121 of the sealing portion 120 to the inner body 130 in a close contact manner, thereby improving the watertightness of the sealing portion 120.

In addition, the shielding wall 1344 extended in a direction perpendicular to the mounting guide 134 may be provided therein, thereby shielding foreign matter such as stone fragments from colliding with the corrugated portion 122 of the sealing portion 120 or the like.

Moreover, the lower fastening portion 1231 of the sealing portion 120 may be recessed in a rectangular shape so as to accommodate a rectangular shaped upper fastening portion 1164 formed on an upper surface of the blade protection cover 116 therein, and thus the lower fastening portion 1231 of the sealing portion 120 may be inserted into and coupled to the rectangular shaped fastening portion 1141 formed on a bottom surface of the lifting frame 114 together with the upper fastening portion 1164 of the blade protection cover 116, thereby securely fastening the sealing portion 120 and the blade protection cover 116 to the bottom surface of the lifting frame 114.

An aspect of the present disclosure provides a lawn mower robot capable of preventing a short circuit phenomenon in a blade motor or the like due to infiltration of water into an inside of the robot. Another aspect of the present disclosure provides a lawn mower robot capable of blocking water from infiltrating into a blade motor even when a blade or the like moves or rotates in a vertical direction.

In order to achieve the foregoing aspects, a light-water reactor according to the present disclosure may include an outer cover; an inner body accommodated into the outer cover, and provided with a plurality of wheels for traveling on both sides thereof; a blade drive motor mounted inside the inner body; a rotating plate driven by the blade drive motor, and rotatably mounted on a bottom surface of the inner body; a plurality of blades rotatably mounted on the rotating plate, and unfolded to an outside of the rotating plate or folded to an inside of the rotating plate; a blade protection cover disposed on a bottom surface of the inner body to cover the rotating plate and the plurality of blades; and a sealing portion configured to seal between the inner body and the blade protection cover.

According to an example associated with the present disclosure, the lawn mower robot may further include a lifting frame mounted with the blade drive motor therein, and liftably mounted into the inner body to adjust a height of the blade.

According to an example associated with the present disclosure, the sealing portion may include a bellows-shaped corrugated portion configured to enable length adjustment in a vertical direction; an upper fastening portion extended radially outward from an upper end of the corrugated portion, and fastened to a bottom surface of the inner body; and a plurality of lower fastening portions formed on a lower surface portion extended radially inward from a lower end of the corrugated portion, and fastened to a bottom surface of the lifting frame.

According to an example associated with the present disclosure, the lawn mower robot may further include a mounting guide configured to mount the sealing portion on a bottom surface of the inner body, wherein the mounting guide includes a close contact portion to allow the upper fastening portion to be in close contact with the bottom surface of the inner body; and a shielding wall extended downward from the close contact portion to enclose the corrugated portion.

According to an example associated with the present disclosure, a plurality of close contact protrusions may be formed to protrude in a concavo-convex shape along an edge thereof on an upper surface of the close contact portion.

According to an example associated with the present disclosure, a plurality of fastening portions may be formed to be recessed on a bottom surface of the lifting frame, and the plurality of lower fastening portions may be formed to be recessed on a lower surface portion of the sealing portion, and a plurality of upper surface fastening portions may be protruded from an upper surface of the blade protection cover, and inserted into and coupled to the plurality of lower fastening portions and the plurality of fastening portions, respectively, and the plurality of fastening portions, the plurality of lower fastening portions, and the plurality of upper fastening portions may be respectively arranged to overlap with each other in a vertical direction and fastened to each other.

According to an example associated with the present disclosure, the lawn mower robot may further include a depressed portion formed to be depressed upward from a bottom surface of the inner body to accommodate part of the sealing portion and the mounting guide, respectively.

According to an example associated with the present disclosure, the lifting frame may include a motor mounting portion extended upward from a bottom surface of the lifting frame; and a motor landing portion extended radially inward from an upper end portion of the motor mounting portion, on which the blade drive motor is seated and fixed, wherein a circular protruding portion is extended upward toward the motor landing portion from an upper central portion of the blade protection cover, and a circular receiving portion is extended upward from an inner end of a lower surface portion of the sealing portion to enclose the circular protruding portion, and the circular receiving portion is inserted into and coupled to an inside of the motor mounting portion.

According to an example associated with the present disclosure, a plurality of through holes may be formed on an upper surface of the blade protection cover to allow stone fragments colliding with the blade to be bounced out to an upper portion of the blade protection cover through the plurality of through holes.

According to an example associated with the present disclosure, the sealing portion may have a plurality of cutout groove portions formed on the upper fastening portion, and the plurality of fastening portions may fasten the sealing portion and the inner body through the plurality of cutout groove portions, respectively.

According to an example associated with the present disclosure, the lifting frame may have a plurality of fastening protrusions on a bottom surface thereof, and the sealing portion may have a plurality of fastening holes to allow the plurality of fastening protrusions to be inserted into and coupled to the lower surface portion, and the plurality of fastening holes and the plurality of lower fastening portions may be alternately arranged along a circumferential direction.

According to an example associated with the present disclosure, the lawn mower robot may further include a rotating cylindrical portion accommodated into the lifting frame, and rotatably mounted into the inner body; and a knob coupled to an upper portion of the rotating cylindrical portion to rotate the rotating cylindrical portion, wherein a male screw portion is formed to protrude in a spiral direction on an outer circumferential surface of the rotating cylindrical portion, and a plurality of spiral protrusions are protruded on an inner side of the lifting frame to be tooth-coupled with the male screw portion.

Aspects of the lawn mower robot according to the present disclosure will be described as follows. First, an upper fastening portion of a sealing portion may be fastened to a lower portion of an inner body, the lower fastening portion of the sealing portion may be fastened in a stacked manner between a lower surface of a lifting frame and an upper surface of a blade protection cover to seal between the inner body and the blade protection cover, thereby preventing water from infiltrating into a lawn mower robot, that is, between the inner body and the blade protection cover, when the robot is immersed in water gathered in a paddle while traveling the puddle or the like.

Second, the sealing portion may have a corrugated portion that can be folded or unfolded in a vertical direction on a lateral side thereof to adjust a length of the sealing portion according to a height of the blade protection cover, thereby blocking the infiltration of water even when the height of the blade and the blade protection cover is adjusted.

Third, a mounting guide may have a planar close contact portion on an upper surface thereof to fasten the upper fastening portion of the sealing portion to the inner body in a close contact manner, thereby improving the watertightness of the sealing portion.

Fourth, a shielding wall extended in a direction perpendicular to the mounting guide may be provided therein, thereby shielding foreign matter such as stone fragments from colliding with the corrugated portion of the sealing portion or the like.

Fifth, a lower fastening portion of the sealing portion may be recessed in a rectangular shape so as to accommodate a rectangular shaped upper fastening portion formed on an upper surface of the blade protection cover therein, and thus the lower fastening portion of the sealing portion may be inserted into and coupled to the rectangular shaped fastening portion formed on a bottom surface of the lifting frame together with the upper fastening portion of the blade protection cover, thereby securely fastening the sealing portion and the blade protection cover to the bottom surface of the lifting frame.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
an upper cover;
an inner frame coupled to the upper cover and configured to be coupled at one or more sides to a plurality of wheels that are driven to move the lawn mower robot;
a motor provided in the inner frame;
one or more blades provided at a lower surface of the inner frame and configured to be rotated based on force from the motor;
a lower cover positioned between the lower surface of the inner frame and the blades;
a lifting frame that receives the motor therein, and is configured to be connected to the inner frame to be vertically movable to adjust a height of the blades;
a seal provided between the inner frame and the lower cover; and a mounting guide configured to mount the seal to the lower surface of the inner frame,
wherein the seal includes:
a bellows-shaped corrugated tube configured to have an adjustable length in a vertical direction;
an upper fastening extension extending radially outward from an upper end of the corrugated tube and configured to be fastened to the lower surface of the inner frame; and
a plurality of lower fastening extensions formed on a lower surface to extend radially inward from a lower end of the corrugated tube and configured to be fastened to a bottom surface of the lifting frame, and
wherein the mounting guide includes:
a contact surface configured to position the upper fastening extension to be adjacent to the lower surface of the inner frame; and
a wall extended downward from the contact surface to enclose the corrugated tube.

2. The lawn mower robot of claim 1, wherein a plurality of protrusions are formed to protrude in a concavo-convex shape along an edge thereof on an upper surface of the contact surface.

3. The lawn mower robot of claim 1, wherein:
a plurality of fastening regions are recessed on a bottom surface of the lifting frame,
the plurality of lower fastening extensions are recessed on a lower surface of the seal,
a plurality of upper surface fastening extensions protrude from an upper surface of the lower cover, and are configured to be inserted into and coupled to the plurality of lower fastening extensions and the plurality of fastening regions, respectively, and
the plurality of fastening portions, the plurality of lower fastening extensions, and the plurality of upper fastening extensions being respectively positioned to overlap with each other in a vertical direction and to be fastened to each other.

4. The lawn mower robot of claim 1, further comprising:
a depression formed to extend upward from the lower surface of the inner frame to accommodate, therein, at least a part of the seal and the mounting guide, respectively.

5. The lawn mower robot of claim 1, further comprising:
a rotating cylinder received in the lifting frame, and rotatably connected to the inner frame; and
a knob coupled to an upper portion of the rotating cylinder to rotate the rotating cylinder,
wherein a male screw is configured to protrude in a spiral direction on an outer circumferential surface of the rotating cylinder, and
a plurality of spiral protrusions are protruded on an inner side of the lifting frame to be tooth-coupled with the male screw.

6. The lawn mower robot of claim 1, wherein a plurality of through holes are formed on an upper surface of the lower cover and are configured to allow stone fragments colliding with the blades to be bounced out to an upper region of the lower cover through the plurality of through holes.

7. The lawn mower robot of claim 1, further comprising:
a rotating plate rotatably positioned between the lower surface of the inner frame and the lower cover,
wherein the blades are positioned on the rotating plate and are configured to move between unfolded positions outside of the rotating plate or folded positions inside of the rotating plate, and
wherein the rotating plate is configured to be rotated by force from the motor to rotate the blades to mow grass.

8. A lawn mower robot, comprising:
an upper cover;
an inner frame coupled to the upper cover and configured to be coupled at one or more sides to a plurality of wheels that are driven to move the lawn mower robot;
a motor provided in the inner frame;
one or more blades provided at a lower surface of the inner frame and configured to be rotated based on force from the motor;
a lower cover positioned between the lower surface of the inner frame and the blades;
a lifting frame that receives the motor therein, and is configured to be connected to the inner frame to be vertically movable to adjust a height of the blades; and
a seal provided between the inner frame and the lower cover,
wherein the seal includes:
a bellows-shaped corrugated tube configured to have an adjustable length in a vertical direction;
an upper fastening extension extending radially outward from an upper end of the corrugated tube, and configured to be fastened to the lower surface of the inner frame; and
a plurality of lower fastening extensions formed on a lower surface to extend radially inward from a lower end of the corrugated tube, and configured to be fastened to a bottom surface of the lifting frame,
wherein the lifting frame includes:
a motor mounting surface extended upward from a bottom surface of the lifting frame; and
a motor landing surface extended radially inward from an upper end portion of the motor mounting portion, and on which the motor is seated and fixed, and
wherein a circular protruding surface is extended upward toward the motor landing portion from an upper central region of the lower cover, and a circular receiving surface is extended upward from an inner end of a lower surface of the seal to enclose the circular protruding surface, and the circular receiving surface is inserted into and coupled to an inside of the motor mounting surface.

9. A lawn mower robot, comprising:
an upper cover;
an inner frame coupled to the upper cover and configured to be coupled at one or more sides to a plurality of wheels that are driven to move the lawn mower robot;
a motor provided in the inner frame;
one or more blades provided at a lower surface of the inner frame and configured to be rotated based on force from the motor;
a lower cover positioned between the lower surface of the inner frame and the blades;
a lifting frame that receives the motor therein, and is configured to be connected to the inner frame to be vertically movable to adjust a height of the blades; and
a seal provided between the inner frame and the lower cover,
wherein the seal includes:
a bellows-shaped corrugated tube configured to have an adjustable length in a vertical direction;
an upper fastening extension extending radially outward from an upper end of the corrugated tube, and configured to be fastened to the lower surface of the inner frame; and a plurality of lower fastening extensions formed on a lower surface to extend radially inward from a lower end of the corrugated tube, and configured to be fastened to a bottom surface of the lifting frame, and wherein the seal includes a plurality of cutout grooves formed on the upper fastening extensions, such that a plurality of fasteners couple the seal and the inner frame through the plurality of cutout grooves, respectively.

10. A lawn mower robot, comprising:

an upper cover;

an inner frame coupled to the upper cover and configured to be coupled at one or more sides to a plurality of wheels that are driven to move the lawn mower robot;

a motor provided in the inner frame;

one or more blades provided at a lower surface of the inner frame and configured to be rotated based on force from the motor;

a lower cover positioned between the lower surface of the inner frame and the blades;

a lifting frame that receives the motor therein, and is configured to be connected to the inner frame to be vertically movable to adjust a height of the blades; and a seal provided between the inner frame and the lower cover, wherein:

the seal includes:

a bellows-shaped corrugated tube configured to have an adjustable length in a vertical direction;

an upper fastening extension extending radially outward from an upper end of the corrugated tube, and configured to be fastened to the lower surface of the inner frame; and a plurality of lower fastening extensions formed on a lower surface to extend radially inward from a lower end of the corrugated tube, and configured to be fastened to a bottom surface of the lifting frame, the lifting frame has a plurality of fastening protrusions on the bottom surface thereof, the seal includes a plurality of fastening holes through which the plurality of fastening protrusions are inserted to be coupled to the lower surface of the seal, and the plurality of fastening holes and the plurality of lower fastening portions are alternately provided along a circumferential direction.

11. A lawn mower robot, comprising:

an upper cover;

an inner frame coupled to the upper cover and configured to be coupled at one or more sides to a plurality of wheels that are driven to move the lawn mower robot;

a motor provided in the inner frame;

one or more blades provided at a lower surface of the inner frame and configured to be rotated based on force from the motor;

a lifting frame that receives the motor therein, and is configured to be connected to the inner frame to be vertically movable to adjust a height of the blades;

a deformable seal provided between the inner frame and the blades; and a mounting guide configured to mount the seal to the lower surface of the inner frame, wherein the seal includes:

a bellows-shaped corrugated tube configured to have an adjustable length in a vertical direction;

an upper fastening extension extending radially outward from an upper end of the corrugated tube, and configured to be fastened to the lower surface of the inner frame; and a plurality of lower fastening extensions formed on a lower surface to extend radially inward from a lower end of the corrugated tube, and configured to be fastened to a bottom surface of the lifting frame, and wherein the mounting guide includes:

a contact surface configured to position the upper fastening extension to be adjacent to the lower surface of the inner frame; and a wall extended downward from the contact surface around the corrugated tube.

12. The lawn mower robot of claim 11, further comprising:

a lower cover positioned between the lower surface of the inner frame and the blades, wherein:

the seal is provided between the inner frame and the lower cover, a plurality of fastening regions are recessed on a bottom surface of the lifting frame, the plurality of lower fastening extensions are recessed on a lower surface of the seal, a plurality of upper surface fastening extensions protrude from an upper surface of the lower cover, and are configured to be inserted into and coupled to the plurality of lower fastening extensions and the plurality of fastening regions, respectively, and the plurality of fastening portions, the plurality of lower fastening extensions, and the plurality of upper fastening extensions being respectively positioned to overlap with each other in a vertical direction and to be fastened to each other.

13. The lawn mower robot of claim 11, further comprising:

a rotating plate rotatably positioned at the lower surface of the inner frame, wherein the blades are positioned on the rotating plate and are configured to move between unfolded positions outside of the rotating plate or folded positions inside of the rotating plate, and wherein the rotating plate is configured to be rotated by force from the motor to rotate the blades to mow grass.

14. A lawn mower robot, comprising:

an upper cover;

an inner frame coupled to the upper cover and configured to be coupled at one or more sides to a plurality of wheels that are driven to move the lawn mower robot;

a motor provided in the inner frame;

one or more blades provided at a lower surface of the inner frame and configured to be rotated based on force from the motor;

a lifting frame that receives the motor therein, and is configured to be connected to the inner frame to be vertically movable to adjust a height of the blades;

a deformable seal provided between the inner frame and the blades; and a lower cover positioned between the lower surface of the inner frame and the blades, wherein:

the seal includes:

a bellows-shaped corrugated tube configured to have an adjustable length in a vertical direction;

an upper fastening extension extending radially outward from an upper end of the corrugated tube, and configured to be fastened to the lower surface of the inner frame; and a plurality of lower fastening extensions formed on a lower surface to extend radially inward from a lower end of the corrugated tube, and configured to be fastened to a bottom surface of the lifting frame, the seal is provided between the inner frame and the lower cover, the lifting frame includes:
   a motor mounting surface extended upward from a bottom surface of the lifting frame; and
   a motor landing surface extended radially inward from an upper end portion of the motor mounting portion, and on which the motor is seated and fixed, a circular protruding surface is extended upward toward the motor landing portion from an upper central region of the lower cover, and a circular receiving surface is extended upward from an inner end of a lower surface of the seal to enclose the circular protruding surface, and the circular receiving surface is inserted into and coupled to an inside of the motor mounting surface.

15. A lawn mower robot, comprising:

an upper cover;

an inner frame coupled to the upper cover and configured to be coupled at one or more sides to a plurality of wheels that are driven to move the lawn mower robot;

a motor provided in the inner frame;

one or more blades provided at a lower surface of the inner frame and configured to be rotated based on force from the motor;

a lifting frame that receives the motor therein, and is configured to be connected to the inner frame to be vertically movable to adjust a height of the blades; and a seal that is deformable and is provided between the inner frame and the blades, wherein:
   the seal includes:
      a bellows-shaped corrugated tube configured to have an adjustable length in a vertical direction;
      an upper fastening extension extending radially outward from an upper end of the corrugated tube, and configured to be fastened to the lower surface of the inner frame; and
      a plurality of lower fastening extensions formed on a lower surface to extend radially inward from a lower end of the corrugated tube, and configured to be fastened to a bottom surface of the lifting frame, the lifting frame has a plurality of fastening protrusions on the bottom surface thereof, the seal includes a plurality of fastening holes through which the plurality of fastening protrusions are inserted to be coupled to the lower surface of the seal, and the plurality of fastening holes and the plurality of lower fastening portions are alternately provided along a circumferential direction.

* * * * *